United States Patent
Erlingstam et al.

(10) Patent No.: US 7,264,266 B2
(45) Date of Patent: Sep. 4, 2007

(54) STEERING-WHEEL ARRANGEMENT

(75) Inventors: Chister Erlingstam, Alingsas (SE); Stefan Andersson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 146 days.

(21) Appl. No.: 10/499,834

(22) PCT Filed: Nov. 22, 2002

(86) PCT No.: PCT/SE02/02126

§ 371 (c)(1),
(2), (4) Date: Jun. 17, 2005

(87) PCT Pub. No.: WO03/051683

PCT Pub. Date: Jun. 26, 2003

(65) Prior Publication Data

US 2005/0230942 A1    Oct. 20, 2005

(30) Foreign Application Priority Data

Dec. 18, 2001  (GB) ................ 0130224.9

(51) Int. Cl.
*B60R 21/16* (2006.01)
*B60R 21/20* (2006.01)

(52) U.S. Cl. .................. 280/728.2; 280/731

(58) Field of Classification Search ............ 280/728.2, 280/731, 728.1
See application file for complete search history.

(56) References Cited

U.S. PATENT DOCUMENTS

| 5,087,069 | A | 2/1992 | Corbett et al. | |
|---|---|---|---|---|
| 5,380,037 | A | 1/1995 | Worrell et al. | |
| 5,590,900 | A * | 1/1997 | Duran et al. | 280/728.2 |
| 5,775,725 | A * | 7/1998 | Hodac et al. | 280/728.2 |
| 5,975,560 | A | 11/1999 | Fischer | |
| 6,029,992 | A | 2/2000 | Vendely et al. | |
| 6,092,832 | A | 7/2000 | Worrell et al. | |
| 6,193,268 | B1 | 2/2001 | Derrick | |
| 6,213,502 | B1 | 4/2001 | Ryan et al. | |
| 6,688,638 | B2 * | 2/2004 | Schutz | 280/728.2 |
| 7,134,360 | B2 * | 11/2006 | Schutz | 74/552 |

FOREIGN PATENT DOCUMENTS

| DE | 19725684 C1 | 12/1998 |
|---|---|---|
| DE | 19730837 A1 | 1/1999 |
| EP | 0 830 990 | 4/2003 |

* cited by examiner

*Primary Examiner*—Eric Culbreth
(74) *Attorney, Agent, or Firm*—Brinks Hofer Gilson & Lione

(57) ABSTRACT

A steering-wheel has an air-bag in it mounted in position by means of connecting pins which are received within housings provided on the frame of the steering-wheel adjacent of the hub of the steering-wheel. The periphery of a cover of the air-bag unit is provided with a moulded bead with co-operates with locating pins provided on the steering-wheel frame adjacent to the end of the cover so that the cover is maintained in a desired position.

14 Claims, 3 Drawing Sheets

STEERING-WHEEL ARRANGEMENT

CROSS REFERENCE TO RELATED APPLICATION

This application claims priority to GB 0130224.9 filed Dec. 18, 2001 and PCT/SE02/02126 filed Nov. 22, 2002.

BACKGROUND AND SUMMARY OF THE INVENTION

The present invention relates to a steering-wheel arrangement, and more particularly relates to a steering-wheel arrangement which includes an air-bag unit containing an air-bag adapted to be inflated in the event that an accident should occur in order to protect the driver of the vehicle.

It has been proposed previously to provide a steering-wheel arrangement incorporating an air-bag unit. In such a prior proposed arrangement, initially a steering-wheel is fabricated including a rim and spokes connecting the rim to a hub plate. The steering-wheel incorporates mounting points for an air-bag unit. Typically the mounting points are on or near to the hub plate. The air-bag unit is mounted in position by engaging connecting elements provided on the air-bag unit with the mounting points provided on the steering-wheel.

Typically the air-bag unit has an upper cover which, in use, is visible, and when the air-bag unit is mounted in position on the steering-wheel, at least parts of the periphery of the cover are spaced from adjacent parts of the steering-wheel. Typically this may occur in the region of the spokes. It is desired to provide a uniform and even gap between the periphery of the cover and the adjacent parts of the steering-wheel, but it has been found that this may be difficult to achieve when the air-bag unit is mounted in position by mounting elements which are located remote from the periphery of the cover. It is, of course, desirable for the air-bag unit to be mounted securely in position on the steering-wheel, since otherwise, subsequent to inflation of the air-bag, the air-bag unit itself may become disengaged from the steering-wheel due to the substantial forces applied to the air-bag unit during, and at the completion of inflation of the air-bag.

The present invention seeks to provide an improved steering-wheel arrangement.

According to this invention there is provided a steering-wheel arrangement comprising a steering wheel and an air-bag unit to be mounted on the steering-wheel, the steering-wheel incorporating at least one mounting unit, the air-bag unit having a cover with a periphery which, when the air-bag unit is in position on the steering-wheel, lies adjacent one or more fixed parts of the steering-wheel, defining a gap therebetween, the air-bag unit having at least one connecting element, the element being engageable with a respective mounting unit on the steering-wheel, the mounting unit comprising a housing, the housing defining at least one aperture through which a connecting element may be inserted, the housing containing a spring clip to engage part of the connecting element to prevent the connecting element from being withdrawn out of the aperture, and thus to retain the air-bag unit, wherein co-operating locating elements are provided on the air-bag unit and on the steering-wheel, the locating elements being located at least two spaced-apart positions and being distanced from each connecting element by a distance greater than one-third of the minimum distance from the said connecting element to the closest part of the periphery of the cover.

Preferably the locating elements are distanced from the associated connecting element by a distance greater than one-half of the minimum distance from the said connecting element to the closest part of the periphery of the cover.

In a preferred embodiment the locating elements provided on the air-bag unit are located at or adjacent the periphery of the cover.

Consequently the periphery of the cover is provided with a moulding defining an inverted channel, the moulding constituting the locating elements.

Preferably the locating elements provided on the steering-wheel are mounted on locating units mounted on the spokes of the steering-wheel.

In such an embodiment each locating unit may be provided with a locating element in the form of a projection to be received within said channel.

Conveniently at least one of the locating elements is provided with a horn actuating switch.

Preferably two or more connecting elements are provided on the air-bag unit, each engageable with a respective mounting unit on the steering-wheel.

Advantageously the connecting element is dimensioned and configured to have a "floating" connection with the respective mounting unit.

Preferably the spring comprises a spring clip adapted to engage the connecting element on two opposed sides.

Advantageously the connecting element is provided with a groove to receive the spring clip.

Conveniently the spring clip is retained within a tubular housing, the housing presenting two aligned apertures to receive the connecting element, the clip being located between the apertures.

Preferably the spring has at least two degrees of freedom of movement within the housing, and the aperture has a larger dimension than that of the part of the connecting element received in the aperture, so that the connecting element may move within the aperture. The air-bag unit may be mounted on the steering-wheel to provide a complete steering-wheel assembly.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
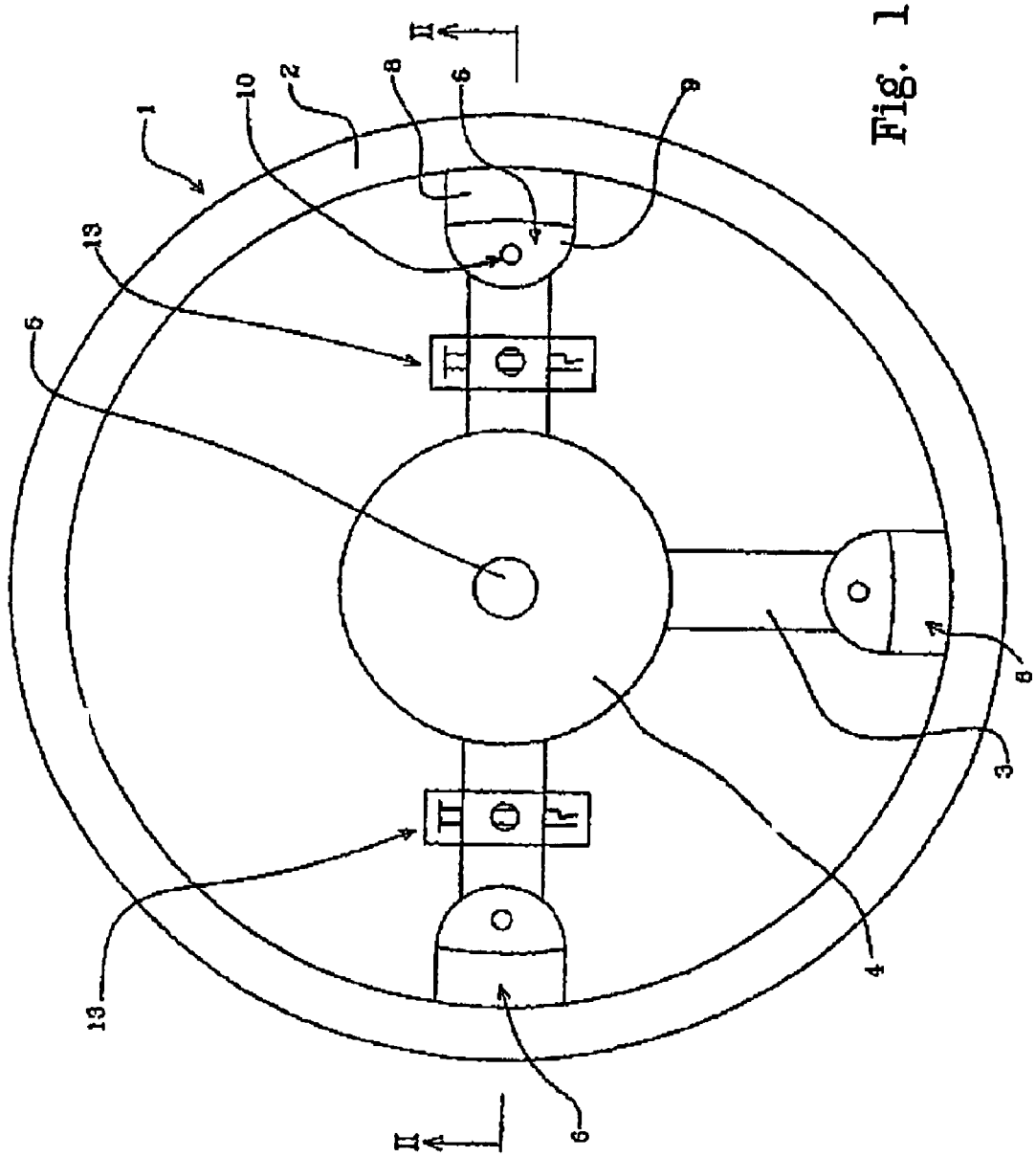
FIG. 1 is a top plan view of a steering-wheel for use in forming a steering-wheel arrangement in accordance with the present invention.
Figure 2:
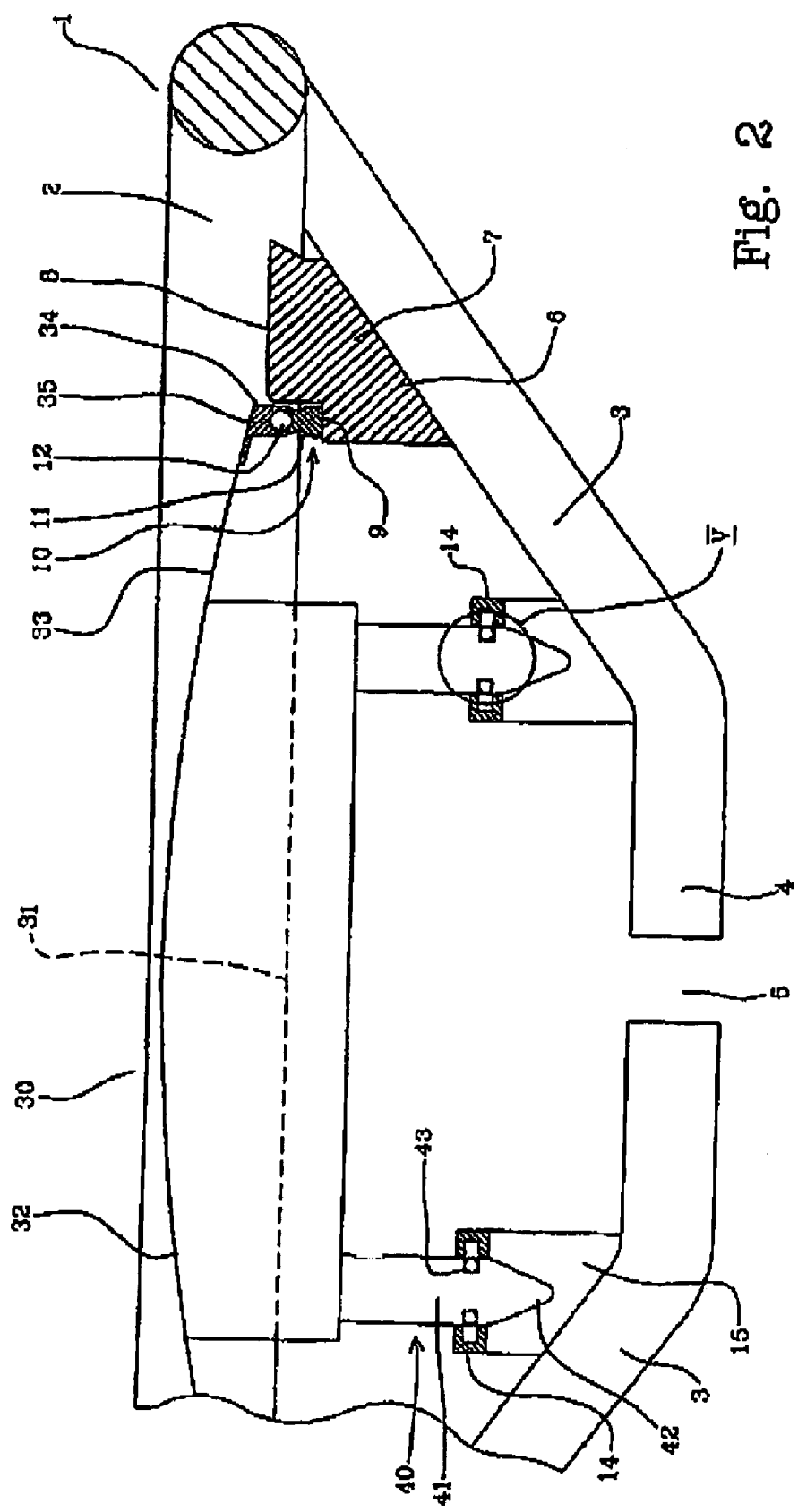
FIG. 2 is a sectional view, with part broken away, taken on the line II-II of FIG. 1, and to an enlarged scale, showing an air-bag unit mounted on the steering wheel.
Figures 3, 4:
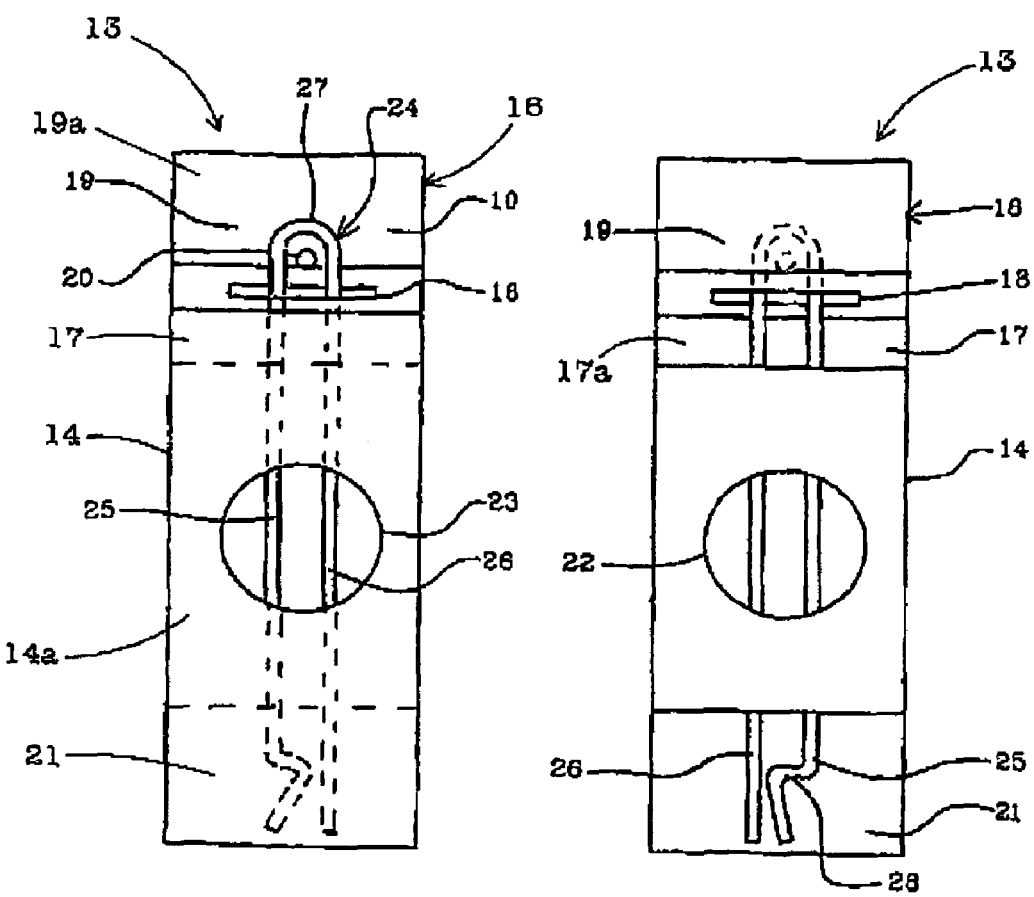
FIG. 3 is a top view of a mounting unit provided on the steering-wheel as shown in FIG. 1.
FIG. 4 is a bottom view of the mounting unit of FIG. 3.

Referring initially to FIGS. 1 and 2 of the accompanying drawings, a steering-wheel assembly in accordance with the invention comprises a steering-wheel 1 having a rim 2 connected by a plurality of spokes 3 to a central hub plate 4 which has an aperture 5 by means of which the steering-wheel may be mounted on a steering column. In the described embodiment there are three spokes.

The spokes 3 are each inclined downwardly from a plane containing the rim 2 of the steering-wheel to a plane containing the hub plate 4 of the steering wheel.

Provided on each of the spoke, adjacent the steering wheel, is a locating unit 6. One locating unit 6 is shown in cross-section in FIG. 2, and the other locating units are of a similar design. The locating unit 6 comprises a main body 7 which is secured to the spoke 3. The body 7 has a horizontal upper surface 8 located adjacent the rim 2 of the steering wheel. The upper surface 8 extends radially inwardly from the rim 2. Part of the unit 6, remote from the rim, defines a locating platform 9 at a level lower than that of the horizontal upper surface 8. The locating platform 9 supports an upwardly directed locating element or pin 10. The pin 10 of the described embodiment is shown as comprising a cylindrical base 11 which carries, at its upper-most end, an egg-shaped upwardly directed locating projection 12. The locating element or pin 10 may incorporate a switch to actuate a horn or hooter.

Two mounting units 13 are mounted on the two of the spokes 3, at diametrically opposed positions on either side of, but adjacent to, the mounting plate 4. As will become clear from the following description, each mounting unit 13 is adapted to receive a respective connecting pin provided on an air-bag unit.

Each mounting unit 13 comprises a housing 14 supported, by depending legs 15, above the respective spoke 3 of the steering-wheel.

The housing 14 is of tubular form of rectangular cross-section, a lower-most base part 14a of the housing extending on one side thereof to form a cranked extension 16. The cranked extension 16 has an initial planar portion 17 which is co-planar with the base 14a of the housing 14 and which extends to a transverse slot 18. In the region of the slot 18, the extension 16 is cranked, to form a terminal part 19 which is off-set from the plane of the planar portion 17. An under-surface 19a of the terminal part 19 lies slightly above an upper surface 17a of the planar portion 17. The under-surface 19a of the terminal part 19 is provided with a depending locating pin 20 located adjacent the slot 18. At the other end of the housing there is a short planar extension 21 co-planar with the base 14a of the tubular portion 14 of the housing.

The upper and lower walls of the housing 14 are provided with circular apertures 22, 23, which are co-aligned, and which will receive a connecting pin provided on the air-bag unit.

A "hairgrip" spring clip 24 is provided having two linear arms 25, 26, which extend parallel with each other, the linear arms being interconnected at one end by means of a "U"-shaped connection 27. At the other end of the spring clip, the arm 25 has a terminal portion 28 which is deflected inwardly towards the end part of the linear arm 26. The "hairgrip" clip may be slid into position through the slot 18, with the "U"-shaped connection 27 located adjacent the pin 20, and with the parallel arms 25, 26 extending through the housing and thus being located between the co-aligned apertures 22 and 23. The clip 24 may move axially within the housing and may also effect a pivoting motion about the axis defined by the pin 20. Thus the arms 25 and 26 within the region of the co-aligned apertures 22 and 23 have at least two degrees of freedom of movement. Ideally the arms 25 and 26 have a diameter slightly less than the vertical interior cross-section of the rectangular tubular housing 14, so that the spring may also move slightly in a vertical direction.

Returning to FIG. 2, an air-bag unit 30 is illustrated mounted in position on the steering-wheel. The air-bag unit 30 has a main housing 31 which contains an air-bag and a gas generator. The housing 31 is provided with an upper cover 32 which has a radially outwardly extending portion 33 which extends beyond the housing 31. The periphery 34 of the cover is adapted to lie adjacent the edge of the horizontal upper surface 8 of the locating unit 6. At the periphery 34 of the cover, a moulding 35 is provided which defines, on the under-surface of the cover a locating element. The moulding 35 defines an inverted channel, configured and dimensioned to matingly engage with the egg-shaped locating projection 12 provided on the locating unit 6.

The under-surface of the housing 31 is provided with two parallel depending connecting elements in the form of connecting pins 40. Each of the connecting pins 40 is provided with a cylindrical body portion 41 which terminates in a conical tapering head 42. At the base of the conical tapering head 42, an annular groove 43 is provided, the groove being dimensioned to receive the arms 25 and 26 of the hair-grip clip 24.

The air-bag unit may be mounted in position by inserting the tapering heads 42 of the connecting pins 40 through the co-aligned apertures 22 and 23 of the two mounting units 13 provided on the spokes 3 of the steering-wheel unit. As a head 42 is inserted through the aligned apertures 22 and 23 of a mounting unit 13 the conical head 42 engages the parallel arms 25 and 26 of the hair-grip clip 24, moving those arms apart until the pin 40 has been inserted into the tubular housing 14 to such an extent that the peripheral groove 43 is co-aligned with the arms 25 and 26 of the clip 24. The arms 25 and 26 then snap into position within the annular groove, to engage opposed sides of the pin, thus holding the pin in position.

Figures 5, 6:
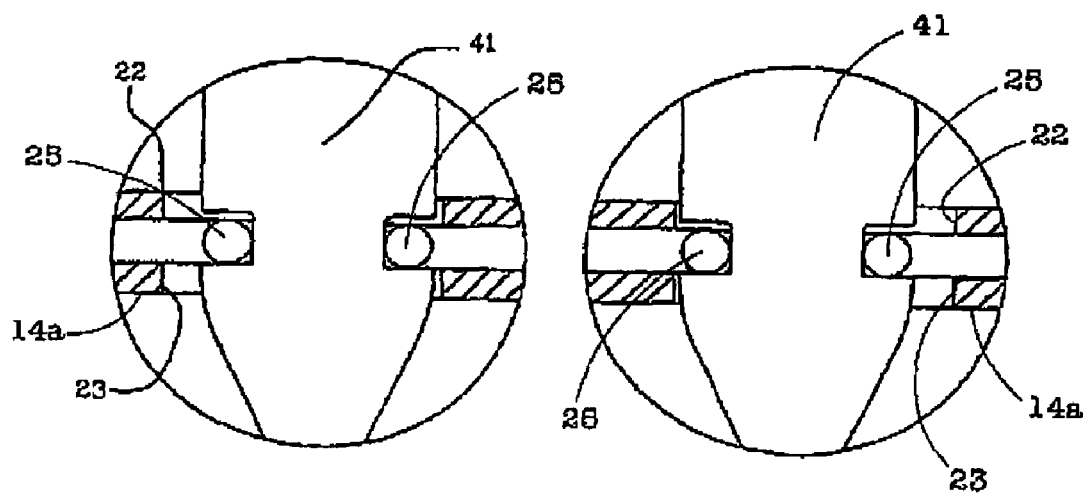
FIG. 5 is a diagrammatic view, taken on the circle V of FIG. 2, illustrating the inter-engagement between a mounting unit and a connecting pin with the components in one condition.
FIG. 6 is a view corresponding to FIG. 5 showing the components in an alternate condition.

As can be seen most clearly from FIGS. 5 and 6, each pin 40 has a diameter which is less than that of the co-aligned apertures 22 and 23, and thus the pin can move, with a horizontal movement, within the apertures. If the arms of the hairgrip clip 24 have a diameter less than the vertical dimension of the interior of the tubular housing 14, the connecting pin may move up and down by a short distance. The pin 40 thus has a "floating" connecting with the housing 14. The connecting pin may not, however, escape from the mounting unit.

The air-bag unit 30 may thus be positioned so that the moulding 35 provided at the periphery 34 of the cover 32 may be engaged with the egg-shaped locating projections 12 provided on the three locating units 6 mounted on the spokes. Thus the periphery of the cover is held in a precisely predetermined position relative to the fixed parts of the steering wheel at three-spaced apart locations. The engagement between the locating units 6 and the air-bag unit 30 is such that there is an even and uniform gap between the periphery 34 of the cover 32 of the air-bag unit 30, and those fixed parts of the steering-wheel 1 which are located adjacent the periphery of the cover. If the locating elements or pins 10 contain horn or hooter actuating switches, a downward pressure on the cover 31 of the air-bag unit 30 will close these switches.

If the air-bag unit has to be removed from the steering-wheel, for example to obtain access to the nut, engaging the steering column and the upper surface of the hub plate 4, which holds the steering-wheel mounted in position on a motor vehicle, access may be gained to the "U"-shaped connection of each hair-grip clip from the underside of the steering-wheel with an appropriate tool, and each hair-grip clip 24 may thus be moved horizontally to withdraw the clip from the tubular housing 14. The configuration of the inwardly directed terminal part 28 of the arm 25 will ensure that the arms will separate as the terminal parts of the arms come past the annular groove 43 formed in the connecting pin 40 received within the housing 14, so that the hair-grip clip 24 becomes disengaged from the connecting pin 40. Thus the air-bag unit 30 may readily be removed from the steering-wheel. The hair-grip clips 24 may then be relocated in the initial position described above for remounting of the air-bag unit 30 on the steering-wheel 1.

In the described embodiment, the inter-engaging locating elements provided on the steering-wheel unit and on the cover which inter-engage to locate the periphery of the cover at a desired location relative to the fixed parts of the steering-wheel are provided at three spaced-apart locations around the periphery of the steering-wheel. It is envisaged that further co-operating locating elements may be provided, or even a locating ring may be provided which extends entirely around the periphery of the steering wheel to engage a co-operating locating element which also extend around the periphery of the cover of the air-bag unit. In any event, the co-operating locating elements are present at least two, and preferably at least three, spaced-apart locations about the steering-wheel.

In the described embodiment two connecting pins are provided, in alternative embodiments, one pin, or three or more pins, may be provided.

Whilst the co-operating locating elements are shown at the very periphery of the air-bag unit, the inter-engaging locating elements could have a different position within an arrangement according to the invention. For example, the co-operating locating elements could be mounted on the outer part of the housing 31 of the air-bag unit, and at an appropriate position on the steering-wheel. It is preferred, however, that the position of the co-operating locating elements should be such that the co-operating locating elements are located a distance away from the closest connecting pin which is at least one-third of the distance from the connecting pin to the closest part of the periphery of the air-bag unit cover. In preferred embodiments, however, the co-operating locating elements are positioned so that the distance between the co-operating locating elements and the closest connecting pin provided on the air-bag unit is at least one-half of the distance between the connecting pin and the closest part of the periphery of the air-bag unit cover. With the co-operating locating elements located at positions away from the connecting pins, and towards the periphery of the cover, especially if the connecting pins are permitted to "float", the cover of the air-bag unit may be retained in a desired position relative to the fixed part of the steering-wheel.

While the above description constitutes the preferred embodiment of the present invention, it will be appreciated that the invention is susceptible to modification, variation and change without departing from the proper scope and fair meaning of the accompanying claims.

The invention claimed is:

1. A steering-wheel arrangement comprising a steering wheel and an air-bag unit to be mounted on the steering-wheel, the steering-wheel incorporating at least one mounting unit, the air-bag unit having a cover with a periphery which, when the air-bag unit is in position on the steering-wheel, lies adjacent one or more fixed parts of the steering-wheel, defining a gap therebetween, the air-bag unit having at least one connecting pin, the connecting pin being engageable with a respective mounting unit on the steering-wheel, the mounting unit comprising a housing, the housing defining at least one aperture through which a connecting pin may be inserted, the housing containing a spring clip to engage part of the connecting pin to prevent the connecting pin from being withdrawn out of the aperture, and thus to retain the air-bag unit, wherein co-operating locating elements are provided on the air-bag unit and on the steering-wheel, the locating elements being located at two or more spaced-apart positions and being distanced from the connecting pin by a distance greater than one-third of the distance from the connecting pin to the closest part of the periphery of the cover.

2. A steering-wheel arrangement according to claim 1 wherein the locating elements are distanced from the connecting pin by a distance greater than one-half of the distance from the connecting pin to the closest part of the periphery of the cover.

3. A steering-wheel arrangement according to claim 1 wherein the locating elements provided on the air-bag unit are located at or adjacent the periphery of the cover.

4. A steering-wheel arrangement according to claim 3 wherein the periphery of the cover is provided with a moulding defining an inverted channel, the moulding constituting at least one of the locating elements.

5. A steering-wheel arrangement according to claim 1 wherein the locating elements provided on the steering-wheel are mounted on locating units mounted on spokes of the steering-wheel.

6. A steering-wheel arrangement according to claim 5 wherein each of the locating units are provided with a locating element in the form of an upwardly directed projection to be received within a channel.

7. A steering wheel arrangement according to claim 1 wherein at least one of the locating elements is provided with a horn actuating switch.

8. A steering wheel arrangement according to claim 1 wherein two or more of the connecting pins are provided on the air-bag unit, each engageable with a respective one of the mounting units on the steering-wheel.

9. A steering-wheel arrangement according to claim 1 wherein the connecting pin is dimensioned and configured to have a floating connection with the respective mounting unit.

10. A steering-wheel arrangement according to claim 1 wherein the spring clip is adapted to engage the connecting pin on two opposed sides.

11. A steering-wheel arrangement according to claim 1 wherein the connecting pin is provided with a groove to receive the spring clip.

12. A steering-wheel arrangement according to claim 1 wherein the spring clip is retained within a tubular housing, the housing presenting two aligned apertures to receive the connecting pin, the clip being located between the apertures.

13. A steering-wheel arrangement according to claim 1 wherein the spring clip has at least two degrees of freedom of movement within the housing, and the aperture has a larger dimension than that of the part of the connecting pin received in the aperture, so that the connecting pin may move within the aperture.

14. A steering-wheel arrangement according to claim 1 wherein the air-bag unit is mounted on the steering-wheel.

* * * * *